Aug. 4, 1959   S. U. PATTON   2,898,165
BEARING CONSTRUCTION WITH EDGE LOAD RELIEF
Original Filed July 2, 1952
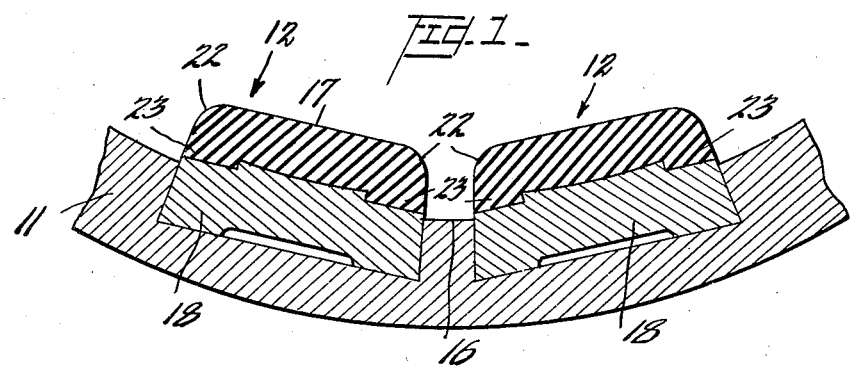
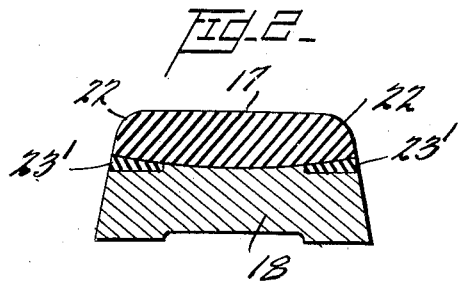
INVENTOR
*Stewart U. Patton,*
BY *George Sipkin*
*B. L. Zanguill*
ATTORNEYS United States Patent Office 2,898,165
Patented Aug. 4, 1959

2,898,165

BEARING CONSTRUCTION WITH EDGE LOAD RELIEF

Stewart U. Patton, Severna Park, Md.

Original application July 2, 1952, Serial No. 296,977. Divided and this application June 28, 1956, Serial No. 594,670

2 Claims. (Cl. 308—239)

(Granted under Title 35, U.S. Code (1952), sec. 266)

The invention described herein may be manufactured and used by or for the Government of the United States of America for governmental purposes without the payment of any royalties thereon or therefor.

This application is a division of application Serial No. 296,977, filed July 2, 1952, for Bearing Construction With Edge Load Relief.

This invention relates to bearing lubrication and more particularly to means for increasing the entry of ambient lubricant into a stave type bearing by relieving bearing pressure at the leading edge of the stave.

Numerous arrangements have been proposed and tried for the purpose of increasing the flow of lubricant into and through a bearing, including beveled edges of bearing staves or bearing half-cylinders, pressure feed systems for forcing lubricant into grooves within the bearing surface, and like arrangements. However, it is found that prior systems do not permit adequate lubrication under conditions of high unit bearing load. An example of severe service requirements for which no satisfactory means has been available is in the strut bearings for propeller shafts whereof the ambient lubricant is the water in which the propeller shaft is immersed. Under such conditions it has been found that no satisfactory lubrication with grease, oil or other similar lubricants is possible. Current practice employs rubber or plastic staves with water as lubricant rather than an oil film. It is well known that water makes a good lubricant only if it can be supplied in a continuous film.

Experience has shown, furthermore, that conventional stave bearings must be relatively narrow so as to occupy a minor portion of the circumference of a journal bearing, thereby to provide more channels for the entry of water into the bearings. Rounding or beveling the edges of the staves has been found to provide some increase in the entry of water into the bearing, but satisfactory results are not achieved thereby. Furthermore, under many conditions of use, it is found that the bearing material must be of soft resilient elastomer material such, for example, as rubber, plastic or the like which are better able to maintain bearing tightness than metal bearings under conditions of abrasive wear. These materials may also wear down rapidly under heavy load, particularly when insufficiently lubricated. As a result a bearing stave, which at first makes only line contact with the rotating shaft supported thereby, is soon worn sufficiently that the contact with the shaft extends substantially throughout the surface of the stave. Therefore, a bearing stave which is provided with a surface making a low angle contact with the shaft so as to provide a thin lubricant wedge area to assure water entry into the bearing, soon develops a sharp wiping edge therealong at the leading edge of the stave in contact with the shaft. This circumstance of wear causes the water or other lubricant to be wiped clean from the shaft as the shaft rotates against the stave, the low angle wedge being eliminated and its effect destroyed. Thereafter the stave bearing operates with insufficient lubricant.

An additional reason for requiring a continuous lubricating film in a bearing is for some purposes of greater importance than the wear particularly with rubber and other soft elastomer faced bearings in that a high unit loading of the bearing surface, with insufficient lubricant, results in bearing squeal. This is highly objectionable particularly in naval service where it is necessary to maintain quiet operation of a vessel to prevent detection thereof by enemy listening devices. The squeal from such bearings may represent a principal noise output from the vessel. Nevertheless, bearings employing rubber or plastic surfaces have sufficient other desirable characteristics to substantially dictate their use.

It is accordingly an object of this invention to provide means insuring the entry of adequate quantities of ambient lubricant between the bearing surfaces of a journal type bearing.

A further object is to provide means for maintaining conditions conducive to entry of ambient lubricant into a journal bearing after the bearing surface has become worn.

A still further object is to provide pressure relief at the leading edge of a bearing stave whereby positive pressure of limited amount exists between bearing surfaces to facilitate entry of lubricant at the leading edge thereof.

A still further object is to provide additional means causing lubricant to enter a bearing of the pivoted or pressure equalizing type.

Yet another object is the provision in a resilient type bearing of additional resilience at the leading edge of a bearing section to provide forced entry of lubricant regardless of condition of wear of the bearing section.

Other objects and advantages of the invention will hereinafter become more fully apparent from the following description of the annexed drawings, which illustrate preferred embodiments; and wherein:

Fig. 1 is a transverse section of a portion of a journal bearing having staves each with a metallic base, a rubber face and means relieving edge pressure; and Fig. 2 is a transverse section of a stave generally similar to those of Fig. 1 and having additional means for relieving edge pressure.

Referring to the drawings, wherein like reference characters designate like or corresponding parts throughout the several views, there is shown in Fig. 1 at 11 a journal bearing housing composed ordinarily of metal and usually cylindrical in shape. Mounted within the housing 11 are staves 12 each composed of a rubber face 17 and a metallic base 18. The metallic base is preferably of trapezoidal shape for locking purposes and the shaft contacting face is formed to compress to approximately the curvature of the shaft when loaded. At the leading edge, or at both edges in case of rotation in either direction, there is provided ordinarily a bevel or radius 22 for the purpose of facilitating entry of lubricant into the bearing as the shaft rotates against the stave 12. It will be understood that when the bevel 22 is arcuate in shape and while still new, a low angle wedge is formed between the shaft lying along surfaces 17 and the bevel 22. However, since some wear takes place a sharp edge is formed and the low angle wedge is lost. When this occurs water or other lubricant will be wiped clean from the shaft as it rotates against surface 17, the sharp edge of the bevel 22 being particularly deleterious with lubricants of this consistency, such as water.

In accordance with the present invention, means is provided for relieving the pressure at the leading edge, or both edges of the stave wherein the rubber face 17 and the bevel portion 22 are employed and a thickened portion of the rubber face material 23 is provided within a cutout portion of the base 18. If the rubber is forced into contact with the shaft some cold flow thereof occurs which is ordinarily observed only at the edges since these portions are unsupported to the same degree as the interior portions. The rubber face material is of relatively firm rubber to support heavy loading and insufficient pressure relief is provided to prevent entry of sufficient water to water lubricated bearing. The insert portion 23 provides an increased tendency for the rubber to relieve itself under pressure along the edge thereof while still maintaining full pressure throughout the central portion of the stave whereby the load normally carried by the stave can be supported.

The staves of Fig. 1 are normally set within the backing 11 fairly close together leaving at the sides thereof a narrow portion 16 of backing material which effectively keys the trapezoidal shaped staves in place. The thickened portions 23 are formed between the portion 16 and the surface 17, the relative location thereof being selected to provide the appropriate degree of flexibility for the particular ambient lubricant employed. When the lubricant is non-viscous, as with water, a greater flexibility is required of the stave portion above the thickened portion than is required where the stave is operated in a more viscous lubricant.

Fig. 2 illustrates a modification of the stave of Fig. 1 wherein the metal stave element 18 is adapted for securing in a journal surface in the same manner as in Fig. 1, or in any other convenient manner. As shown in Fig. 2, the thickened portion of the rubber face material (23 of Fig. 1) has been removed and a soft rubber insert 23' has been inserted within the cutout portion of the metal base 18. The soft rubber insert 23' has greater resiliency than the rubber material of the face 17, whereby increased reduction of wiping pressure is effected at the edges of the stave.

While in each of the illustrations both edges of the stave are provided with pressure relieving means, it will be understood that this arises from the necessity, under some circumstances, to operate the shaft in both directions of rotation, and that if a single direction is sufficient, the pressure relieving means would preferably be supplied only at the leading edge.

It will thus be seen that means has been provided for relieving leading edge pressure under a rubber, plastic or other resilient bearing stave sufficient to increase the resilience thereof and provide positive "dragging in" of lubricant from the leading edge of the stave across the surface thereof to prevent rapid wear, squeal and other factors adversely affecting bearing performance. On each of the arrangements illustrated, consideration is given to the normal loading of the bearing stave which results in deflection thereof sufficiently to prevent a sharp wiping edge at the leading edge of the stave, at least after the bearing has become "worn in." The degree of resilience herein described as being achieved by providing a thickened portion of rubber face material under the leading edge, or by inserting a more resilient strip material thereunder, is limited to a few thousandths of an inch or less, since this provides an adequate pressure relief whereby lubricant is forced into the bearing all along the leading edge of the stave. The construction described thereby provides longer life for bearings especially of the water-lubricated type and markedly improves the resistance thereof to a tendency to squeal under conditions of heavy load. For purposes of illustration, the bevel or radius at the leading edge of the stave is exaggerated in the drawing. In actual practice, in accordance with this invention, so long as the thickened portion 23 (Fig. 1) of the rubber face material or the soft rubber insert 23' (Fig. 2) penetrates the stave appreciably beyond the line of contact of the shaft and leading edge of the stave, a very slight bevel or radius is all that is necessary to prevent the formation of a sharp wiping edge during the wearing-in stage of the bearing.

Various modifications are contemplated and may obviously be resorted to by those skilled in the art without departing from the spirit and scope of the invention, as hereinafter defined by the appended claims, only preferred embodiments being disclosed.

What is claimed is:

1. A bearing for supporting a rotatable shaft comprising a journal bearing housing, a plurality of spaced staves attached to and extending the length of said housing for supporting a shaft adapted to rotate therein, each of said staves comprising a metal backing plate for attachment to said housing and a rubber member attached to said plate, said rubber member having sides and a face adapted for contact by said shaft, a tapered edge joining each of said sides with said face and means for relieving the pressure of said shaft on the tapered edges, said means comprising a rubber backing extending along said sides but beneath the stave bearing surface of the intersection with the tapered edges of said stave, whereby said bearing surface at the tapered edges are flexed downwardly by said shaft for preventing the wiping of a lubricant from said shaft when the latter is placed in rotation while maintaining a curvature in the face of the rubber member substantially that of the shaft rotatably supported thereby, said metal backing plate being formed with a cutout at each side thereof and said rubber backing including a strip of relatively soft rubber placed in each of said cutouts, said strip of relatively soft rubber having greater elasticity than that of the rubber member.

2. A bearing for supporting a rotatable shaft comprising a journal bearing housing, a plurality of spaced longitudinally extending staves attached to the inner peripheral portion of said housing for supporting a shaft adapted to rotate therein, each of said staves comprising a metal backing plate having sides and a face secured to said journal bearing housing, a rubber member attached to said plate having sides and a face adapted for contact by said shaft, a beveled edge joining said sides and said face of said rubber member, and pressure relieving means in the side portions of said stave for relieving the pressure on said edges caused by said shaft when the latter is rotated thereby providing access for flow of a lubricant across said staves, said pressure relieving means comprises a cutout portion on opposite ends of said face of said metal backing plate, said cutout portions extending the length of said plate and being positioned adjacent and inwardly of the sides thereof, and said rubber member attached to said plate comprising an inverted U-shaped support having the legs thereof fitting into said cutout portions, whereby the pressure of said shaft is relieved along the edges of said rubber member by virtue of the additional amount of rubber in said legs of said U-shaped support while maintaining a curvature in the face of the rubber member substantially that of the shaft rotatably supported thereby, said legs of the U-shaped support fitting into said cutout portions being formed of relatively soft rubber, which soft rubber has greater elasticity than that of the remainder of the rubber member.

References Cited in the file of this patent

UNITED STATES PATENTS

| | | |
|---|---|---|
| 1,885,339 | Evans | Nov. 1, 1932 |
| 1,895,936 | Merrill | Jan. 31, 1933 |
| 2,061,767 | Hobson | Nov. 24, 1936 |
| 2,256,647 | Merrill | Sept. 23, 1941 |
| 2,307,874 | Bilde | Jan. 12, 1943 |

FOREIGN PATENTS

| | | |
|---|---|---|
| 408,214 | Germany | Jan. 22, 1925 |